US012537342B2

(12) United States Patent
Lin

(10) Patent No.: US 12,537,342 B2
(45) Date of Patent: Jan. 27, 2026

(54) CONNECTOR, CONNECTOR MODULE AND ELECTRONIC EQUIPMENT

(71) Applicant: Heshan Deren Electronic Technology Co., Ltd., Jiangmen (CN)

(72) Inventor: Zongbiao Lin, Jiangmen (CN)

(73) Assignee: Heshan Deren Electronic Technology Co., Ltd., Jiangmen (CN)

( * ) Notice: Subject to any disclaimer, the term of this patent is extended or adjusted under 35 U.S.C. 154(b) by 323 days.

(21) Appl. No.: 18/139,993

(22) Filed: Apr. 27, 2023

(65) Prior Publication Data

US 2023/0402794 A1 Dec. 14, 2023

(30) Foreign Application Priority Data

Jun. 10, 2022 (CN) ........................ 202221461656.X

(51) Int. Cl.

| | |
|---|---|
| ***H01R 13/64*** | (2006.01) |
| ***H01R 12/70*** | (2011.01) |
| ***H01R 12/71*** | (2011.01) |
| ***H01R 13/516*** | (2006.01) |
| ***H01R 13/6471*** | (2011.01) |

(52) U.S. Cl.
CPC ....... *H01R 13/6471* (2013.01); *H01R 12/707* (2013.01); *H01R 12/716* (2013.01); *H01R 13/516* (2013.01)

(58) Field of Classification Search
CPC .............. H01R 13/6471; H01R 12/707; H01R 12/716; H01R 13/516; H01R 12/737
See application file for complete search history.

(56) References Cited

U.S. PATENT DOCUMENTS

| | | | | |
|---|---|---|---|---|
| 3,631,381 A | 12/1971 | Pittman | | |
| 6,375,508 B1 * | 4/2002 | Pickles | H01R 12/727 439/607.11 |
| 9,972,945 B1 * | 5/2018 | Huang | H01R 13/6585 |
| 10,027,066 B2 * | 7/2018 | Zhong | H01R 24/60 |
| 10,396,499 B1 * | 8/2019 | Shen | H01R 13/6594 |

(Continued)

FOREIGN PATENT DOCUMENTS

| | | |
|---|---|---|
| CN | 204696287 U | 10/2015 |
| CN | 110994247 A | 4/2020 |

(Continued)

*Primary Examiner* — Truc T Nguyen
(74) *Attorney, Agent, or Firm* — IPRO, PLLC; Na Xu

(57) ABSTRACT

Embodiments of the present application relate to the technical field of connectors, and particularly disclose a connector, a connector module and an electronic equipment, wherein a connector for connecting with an external electronic device comprises an insulating body, a terminal module and a conductive member, the insulating body is opened with a slot for plugging and matching with the electronic device; the terminal module comprises several pairs of signal terminals and several ground terminals installed on the insulating body, the signal terminals and the ground terminals at least partially extend into the slot, the signal terminals and the ground terminals are arranged along a first direction, and at least two ground terminals are arranged between each adjacent pair of the signal terminals; the conductive member is installed on the insulating body, and at least one of the ground terminals is connected with the conductive member in at least two places.

8 Claims, 5 Drawing Sheets

(56) References Cited

U.S. PATENT DOCUMENTS

| | | | | | |
|---|---|---|---|---|---|
| 11,626,693 | B2 * | 4/2023 | Hu | H01R 13/6471 | 439/62 |
| 11,715,907 | B2 * | 8/2023 | Chen | H01R 13/6581 | 439/607.55 |
| 2011/0189895 | A1 * | 8/2011 | Ito | H01R 24/38 | 439/629 |
| 2015/0111401 | A1 * | 4/2015 | Guo | H01R 13/6594 | 439/95 |
| 2020/0212632 | A1 * | 7/2020 | Liong | H01R 12/716 | |
| 2021/0126402 | A1 * | 4/2021 | Zhang | H01R 12/716 | |
| 2022/0239041 | A1 * | 7/2022 | Hu | H01R 12/737 | |
| 2023/0238724 | A1 * | 7/2023 | Yang | H01R 12/737 | 439/328 |

FOREIGN PATENT DOCUMENTS

| | | | |
|---|---|---|---|
| CN | 111029821 | A | 4/2020 |
| CN | 112886340 | A | 6/2021 |

* cited by examiner

CONNECTOR, CONNECTOR MODULE AND ELECTRONIC EQUIPMENT

CROSS-REFERENCE TO RELATED APPLICATIONS

This present disclosure claims priority to Chinese Patent Application No. 202221461656.X, filed with the Chinese Patent Office on Jun. 10, 2022, and entitled "PROJECTION APPARATUS", the entire contents of which are incorporated herein by reference.

TECHNICAL FIELD

Embodiments of the present application relate to the technical field of connectors, and in particular, relate to a connector, a connector module and an electronic equipment.

BACKGROUND

Usually, connectors are also called electronic connectors, circuit connectors and electrical connectors, which are conductor equipments that bridge two conductors in a loop so that current or signals can flow from one conductor to the other conductor. A connector can provide a separable interface to connect two sub-electronic systems; in brief, elements used to complete the electrical connection among circuits or electronic machines or the like are called connectors, i.e., bridges between the circuits or electronic machines.

Nowadays, computer technology is developing rapidly with each passing day, desktop computers and notebook computers are ubiquitous in every corner of society, the development trend of computers is also moving towards the direction of strong computing function, high speed and small size, and connectors inside the computers are also greatly reduced accordingly to adapt to the development trend of the computers today.

At present, during the use of the traditional connector, high resonance is likely to occur at the conductive terminal, which affects the quality and reliability of high-speed signal transmission of the connector, and thus, the traditional wire connector is equipped with ground terminals to shield resonance; however, the inventor of the present application has found in the process of implementing the present application that: there is only one return path for the ground terminals, and the shielding effect is limited.

SUMMARY

A technical problem mainly solved by embodiments of the present application is to provide a connector, a connector module and an electronic equipment, which can increase the return paths for ground terminals.

In order to solve the above technical problem, a technical solution adopted by the present application is to provide a connector for connecting with an external electronic device, the connector comprises an insulating body, a terminal module and a conductive member, the insulating body is opened with a slot for plugging and matching with the electronic device; the terminal module comprises several pairs of signal terminals and several ground terminals installed on the insulating body, the signal terminals and the ground terminals at least partially extend into the slot, the signal terminals and the ground terminals are arranged along a first direction, and at least two ground terminals are arranged between each adjacent pair of the signal terminals; the conductive member is installed on the insulating body, and at least one of the ground terminals is connected with the conductive member in at least two places.

Preferably, in the first direction, the two ground terminals between each adjacent pair of the signal terminals are connected with the conductive member.

Preferably, the ground terminal comprises a fixing part, a connecting arm, a first contacting part and a second contacting part, the fixing part is fixed with the insulating body; the connecting arm is formed by extending from the fixing part, the connecting arm at least partially extends into the slot and is configured to be electrically connected with golden fingers on the electronic device; the first contacting part is arranged on the connecting arm, the first contacting part is connected with the conductive member; the second contacting part is arranged on the fixing part, the second contacting part is connected with the conductive member; wherein, a groove is enclosed by the second contacting part and the connecting arm, and the conductive member is at least partially accommodated in the groove.

Preferably, a punching surface of the ground terminal is perpendicular to a punching surface of the signal terminal.

Preferably, the conductive member is arranged on one side of the terminal module facing away from the slot.

Preferably, the connector comprises two terminal modules and two conductive members; the two terminal modules are oppositely arranged on both sides of the slot along a second direction, and the two conductive members are oppositely arranged on both sides of the slot along the second direction, and the conductive members are used for connecting multiple ground terminals on one side of the slot.

According to another aspect of the embodiment of the present application, a connector module is provided, the connector module comprises the aforesaid connector and a circuit board, the circuit board is provided with first pads and second pads, each of the signal terminals is correspondingly welded to one of the first pads, and the ground terminal is correspondingly welded to one of the second pads, and the size of the first pads is the same as that of the second pads.

Preferably, one or two of the ground terminals are welded to the same second pad.

Preferably, the connector further comprises a fixing piece, and the fixing piece comprises: a first connecting part, being fixed on the insulating body; and a second connecting part, being welded to the circuit board.

According to another aspect of the embodiment of the present application, an electronic equipment is provided, and the connector module comprises the aforesaid connector module or comprises the aforesaid connector.

Beneficial effects of the embodiments of the present application are as follows: unlike the situation in the prior art, the ground terminal of the embodiment of the present application is connected with the conductive member in at least two places, so that the return paths of resonance are increased, thereby improving the shielding effect of resonance.

BRIEF DESCRIPTION OF THE DRAWINGS

In order to explain technical solutions of the embodiments of the present application more clearly, attached drawings required in the embodiments of the present application will be briefly introduced below; obviously, the attached drawings described below are only some embodiments of the present application, and other attached drawings can be obtained by those of ordinary skill in the art according to the attached drawings without creative labor.

DETAILED DESCRIPTION

In order to facilitate the understanding of the present application, the present application will be described in more detail hereinafter with reference to the attached drawings and specific embodiments. It shall be noted that, when an element is said to be "fixed" to another element, it may be directly on the another element, or there may be one or more intervening elements therebetween. When an element is said to be "connected" to another element, it may be directly connected to another element, or there may be one or more intervening elements therebetween. Terms such as "vertical", "horizontal", "left" and "right" and similar expressions used in this specification are for illustrative purposes only.

Unless otherwise defined, all technical and scientific terms used in this specification have the same meaning as commonly understood by those skilled in the art of the present application. In the present specification, the terms used in this specification of the present application are only for the purpose of describing specific embodiments, and are not used to limit the present application. The term "and/or" used in this specification comprises any and all combinations of one or more associated items listed.

Figure 1:
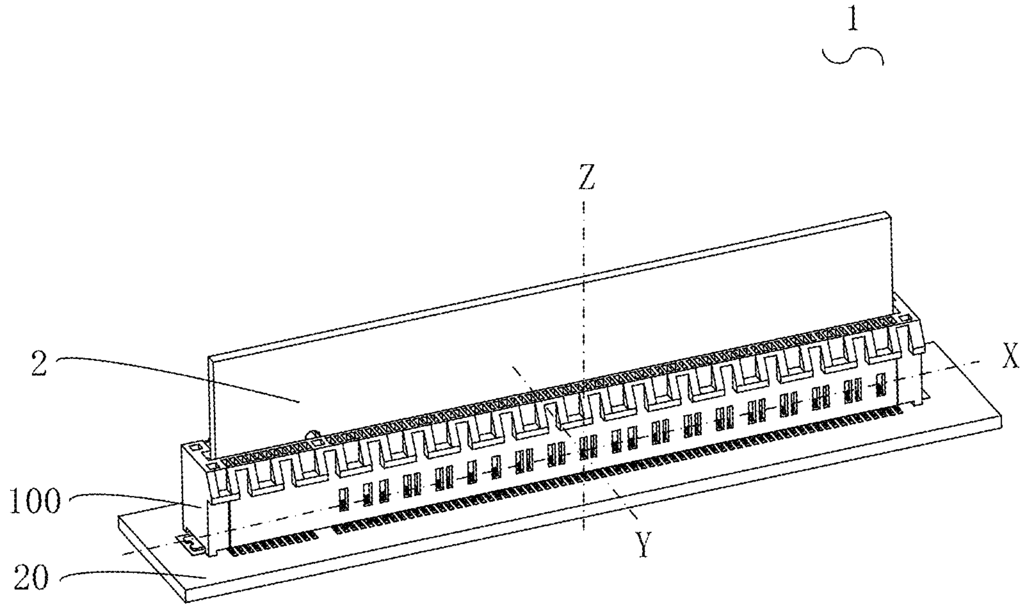
FIG. 1 is a schematic perspective view of a connector module according to an embodiment of the present application.
Figure 2:
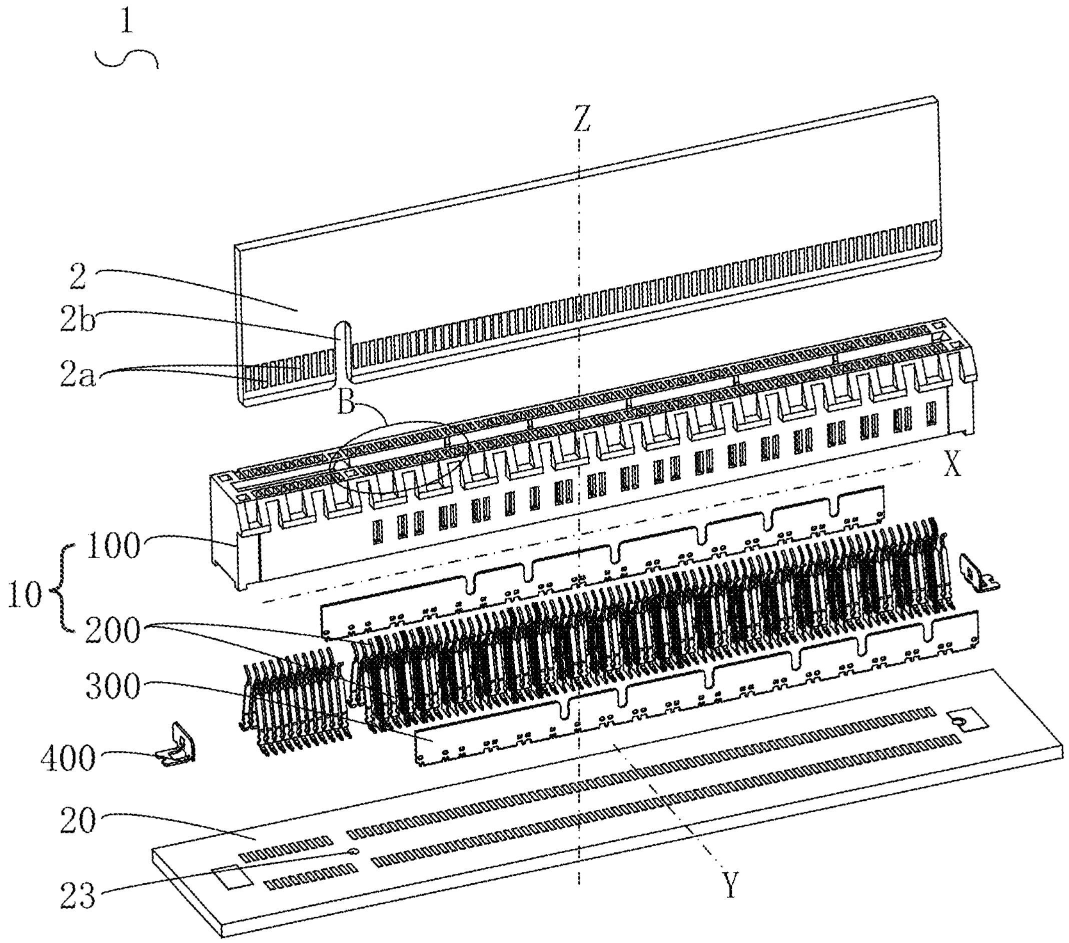
FIG. 2 is a schematic exploded view of the connector module according to the embodiment of the present application.
Figure 3:
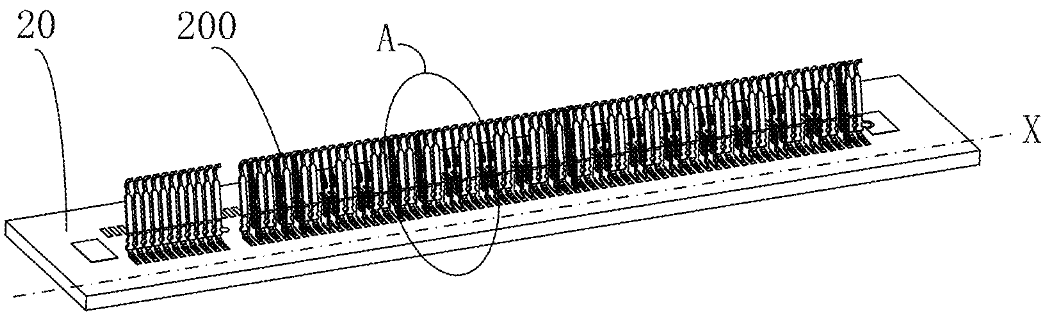
FIG. 3 is a schematic view illustrating the welding of ground terminals on a circuit board according to the embodiment of the present application.
Figure 4:
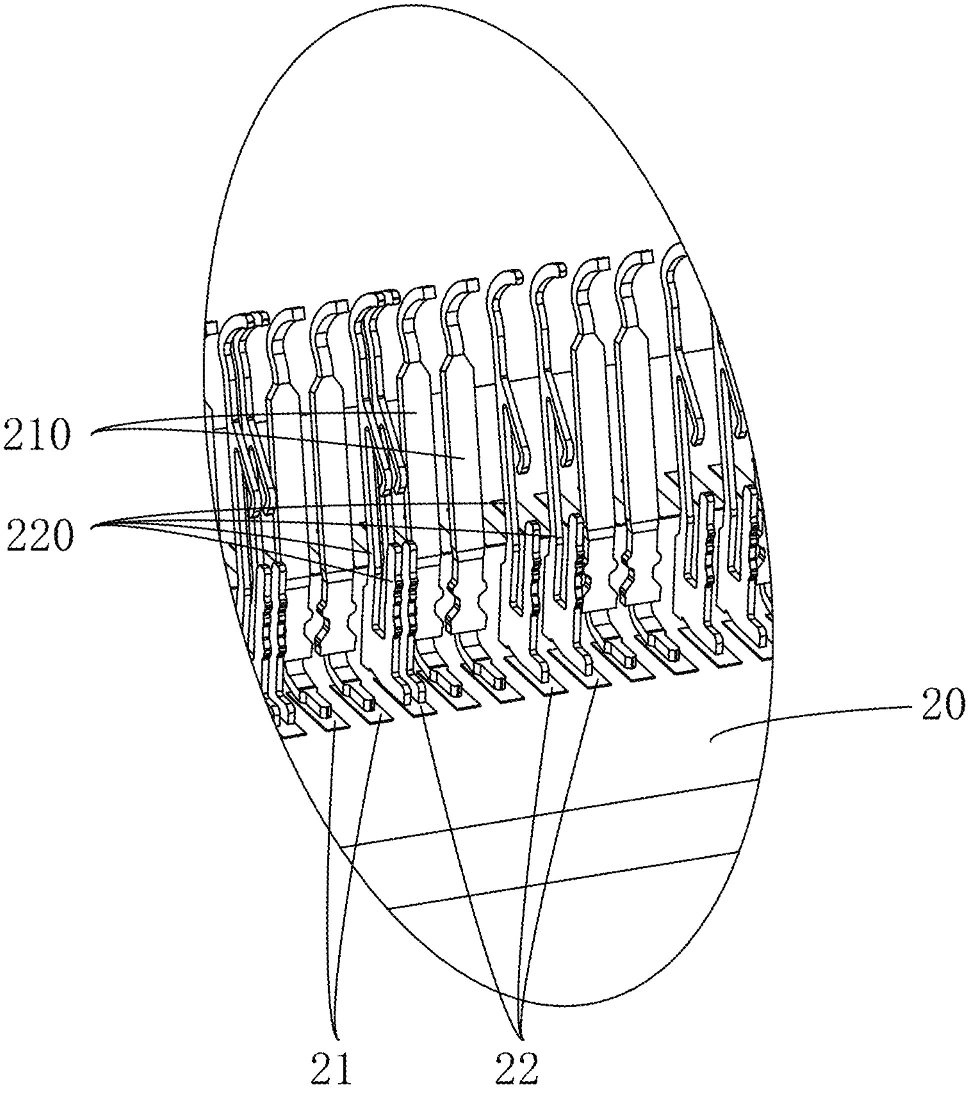
FIG. 4 is an enlarged view of a part A in FIG. 3.

Please refer to FIG. 1 to FIG. 4, FIG. 1 and FIG. 2 show a schematic perspective view and a schematic exploded view of a connector module according to an embodiment of the present application, FIG. 3 shows a schematic view illustrating the welding of ground terminals on a circuit board according to an embodiment of the present application, and FIG. 4 shows an enlarged view of a part A in FIG. 3. A connector module 1 is used for connecting with an external electronic device 2, the connector module 1 comprises a connector 10 and a circuit board 20, the connector 10 comprises an insulating body 100, a terminal module 200 and a conductive member 300, and the insulating body 100 is opened with a slot 110 for plugging and matching with the electronic device 2. The terminal module 200 comprises several pairs of signal terminals 210 and several ground terminals 220 installed on the insulating body 100, the signal terminals 210 and the ground terminals 220 at least partially extend into the slot 110, the signal terminals 210 and the ground terminals 220 are arranged along a first direction X, and at least two ground terminals 220 are arranged between each adjacent pair of the signal terminals 210. The conductive member 300 is installed on the insulating body 100, and the ground terminal 220 is connected with the conductive member 300 in at least two places. The circuit board 20 is provided with first pads 21 and second pads 22, both the first pads 21 and the second pads 22 are cuboid-shaped and have the same size, each signal terminal 210 is correspondingly welded to one of the first pads 21, the ground terminal 220 is correspondingly welded to one of the second pads 22, and the size of the first pads 21 is the same as that of the second pads 22. It shall be noted that, in the embodiment of the present application, the size of the first pads 21 being the same as that of the second pads 22 means that the length, width and height of the first pads 21 are respectively equal to those of the second pads 22, but the specific shapes and sizes of the first pads 21 and the second pads 22 are not limited in the present application; in other embodiments of the present application, the shapes and sizes of the first pads 21 may be different from those of the second pads 22, and the first pad 21 and the second pad 22 may also have other shapes such as a cylinder, a circular truncated cone, a prism and a frustum of a prism.

Figure 5:
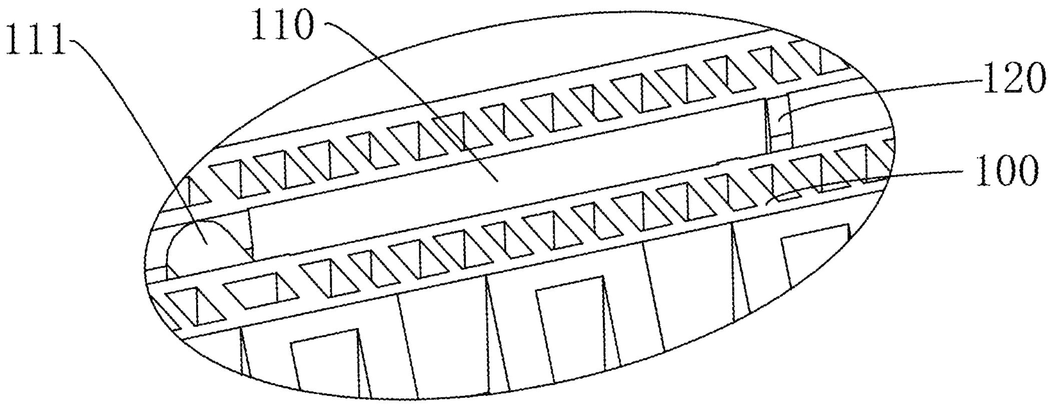
FIG. 5 is an enlarged view of a part B in FIG. 2.

For the above-mentioned insulating body 100, reference is made to FIG. 5, which shows an enlarged view of a part B in FIG. 2, in combination with FIG. 2, the insulating body 100 is cuboid-shaped on the whole and extends along the first direction X, the slot 110 is arranged at one end of the insulating body 100 facing away from the circuit board 20, the slot 110 is cuboid-shaped and extends along a second direction Y, the bottom of the slot 110 extends towards the opening of the slot 110 along a third direction Z to form a positioning part 111, the electronic device 2 is provided with a corresponding positioning slot 2*b*, and the positioning part 111 plays a role of positioning when the electronic device 2 is inserted into the slot 110 so as to prevent reverse installation of two ends of the electronic device 2 in the first direction X, which otherwise would affect the electrical connection of the electronic device 2. Rib plates 120 are provided at both ends of the positioning part 111 along the first direction X and at two sidewalls of the slot 110 along the second direction Y, and the rib plates 120 are used for tightly fitting with the electronic device 2 when the electronic device 2 is inserted into the slot 110, thereby realizing the fixed installation of the electronic device 2 on the insulating body 100. At the place near the opening of the slot 110 along the third direction Z, the positioning part 111 is designed in a semi-circular arc shape, and the rib plates 120 are provided with chamfers so as to make it convenient for the electronic device 2 to be inserted into the slot 110. It shall be noted that, the specific shapes of the insulating body 100 and the slot 110 are not limited in the present application, and in other embodiments of the present application, the insulating body 100 and the slot 110 may have shapes such as a cylinder, a prism or a frustum of a prism as long as the electronic device 2 can be accommodated and installed on the insulating body 100. It shall also be noted that, in the embodiment of the present application, the positioning part 111 is arranged at about one seventh of the slot 110 in the first direction X, but the specific position of the positioning part 111 is not limited in the present application, and in other embodiments of the present application, the positioning part 111 may also be arranged at one sixth or one third of the slot 110 in the first direction X as long as the positioning part 111 is not located at one half of the slot 110 in the first direction X.

For the terminal module 200 described above, please refer to FIG. 2 to FIG. 4, two ground terminals 220 are arranged between each pair of adjacent signal terminals 210, and the two ground terminals 220 may be welded to the same second pad 22, or each ground terminal 220 is welded to one second pad 22. The design of arranging two ground terminals 220 between adjacent signal terminals 210 can further increase the return paths of resonance and enhance the shielding effect. There are two groups of terminal modules 200, and the two groups of terminal modules 200 are oppositely arranged on both sides of the slot 110 along the second direction Y. The design of the two groups of terminal modules 200 can enable the connector 10 to be designed with more signal terminals 210 and ground terminals 220 under the same length in the first direction X, thereby increasing the space utilization ratio and preventing the connector 10 from being oversized in a single direction. It shall be noted that, the numbers of the signal terminals 210 and the ground terminals 220 in the terminal module 200 are not limited in the present application as long as the terminal module 200 comprises at least two pairs of signal terminals 210 and two ground terminals 220 therein, and when the terminal module 200 only comprises two pairs of signal terminals 210 and two ground terminals 220 therein, the two ground terminals 220 are arranged between the two pairs of signal terminals 210.

Figure 6:
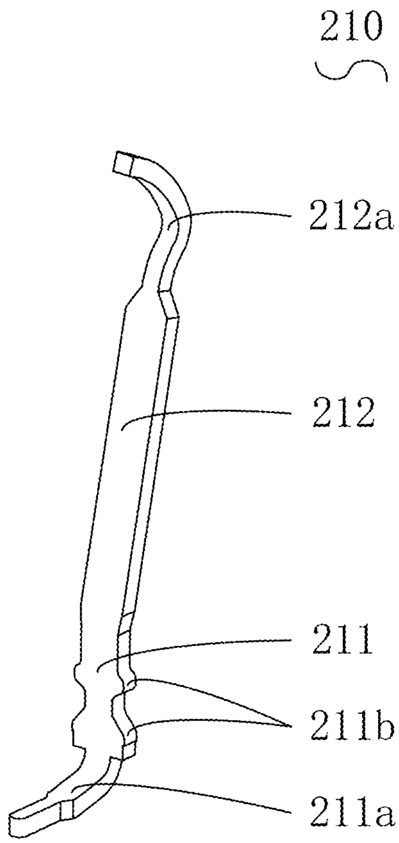
FIG. 6 is a schematic perspective view of a signal terminal according to an embodiment of the present application.

For the signal terminal 210 described above, please refer to FIG. 6, which shows a schematic perspective view of the signal terminal according to the embodiment of the present application. The signal terminal 210 comprises a holding part 211 and an extension arm 212, the holding part 211 and the extension arm 212 are provided at a certain angle, one end of the holding part 211 away from the extension arm 212 is bent to form a welding end 211*a* which is used for welding with the first pad 21, and one end of the extension arm 212 away from the holding part 211 is bent to form a contacting end 212*a* which is used for extending into the slot 110 and making electrical connection with golden fingers 2*a* on the electronic device 2. Two sides of the holding part 211 extend in the first direction X to form protrusions 211*b*, and when the signal terminal 210 is installed on the insulating body 100, the extension arm 212 first extends into the insulating body 100 until the contacting end 212*a* penetrates into the slot 110, and the holding part 211 abuts against the insulating body 100 so as to limit the penetration depth of the signal terminal 210; and at this point, the welding end 211*a* is exposed outside the insulating body 100.

Figure 7:
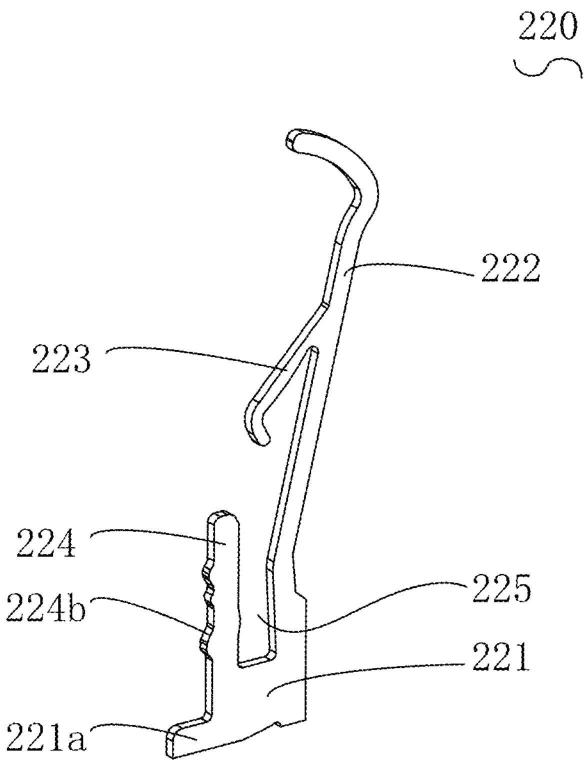
FIG. 7 is a first schematic perspective view of a ground terminal according to an embodiment of the present application.
Figure 8:
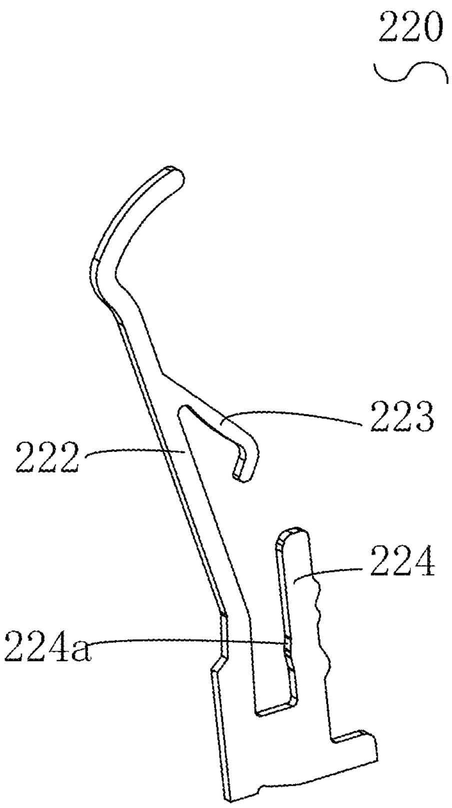
FIG. 8 is a second schematic perspective view of the ground terminal according to the embodiment of the present application.

For the ground terminal 220 described above, please refer to FIG. 7 and FIG. 8, which show two schematic perspective views of the ground terminal according to the embodiment of the present application. The ground terminal 220 comprises a fixing part 221, a connecting arm 222, a first contacting part 223 and a second contacting part 224. The fixing part 221 is used for fixing with the insulating body 100, one side of the fixing part 221 facing away from the socket 110 extends in the second direction Y to form a welding part 221*a*, and the welding part 221*a* is used for welding with the second pad 22. The connecting arm 222 is formed by extending from the fixing part 221, the connecting arm 222 at least partially extends into the slot 110, and the connecting arm 222 is used for electrical connection with the golden fingers 2*a* on the electronic device 2. The first contacting part 223 is disposed on the connecting arm 222, and the first contacting part 223 abuts against the conductive member 300 in the second direction Y. The second contacting part 224 is arranged on one side of the fixing part 221 facing away from the socket 110 in the second direction Y, the second contacting part 224 extends towards the connecting arm 222 in the second direction Y and is formed with a contact protrusion 224*a*, the contact protrusion 224*a* abuts against the conductive member 300 in the second direction Y, the second contacting part 224 extends facing away from the connecting arm 222 in the second direction Y and is formed with an abutting protrusion 224*b*, the abutting protrusion 224*b* abuts against the insulating body 100 in the second direction Y, and a groove 225 is enclosed by the second contacting part 224 and the connecting arm 222, the conductive member 300 is partially accommodated in the groove 225, both sides of the conductive member 300 in the second direction Y abut against the first contacting part 223 and the second contacting part 224 respectively; the arrangement of the groove 225 may clamp the conductive member 300 on the ground terminal 220, thereby increasing the connection strength between the ground terminal 220 and the conductive member 300, and preventing the conduction of resonance between the ground terminal 220 and the conductive member 300 from being affected by the poor contact. The first contacting part 223 and the second contacting part 224 are electrically connected to the conductive member 300 at the same time, thereby increasing the return paths of resonance on the ground terminals 220. Specifically, after the resonance enters the ground terminal 220 from the connecting arm 222, it may directly return to the circuit board 20 from the fixed part 221 of this ground terminal 220, or it may arrive at the fixing part 221 of this ground terminal 220 through the conductive member 300 and then return to the circuit board 20, or it may arrive at the fixing part 221 of other ground terminals 220 through the circuit board 20 and then return to the circuit board 20. It shall be noted that, the number of contacting parts is not limited in the present application, and in other embodiments of the present application, the number of the contacting parts may also be three or five and so on, and the multiple contacting parts are arranged on the connecting arm 222 and the fixing part 221 at intervals as long as the number of the contacting parts is at least two, and at least one contacting part is arranged on the connecting arm 222.

Preferably, the ground terminals 220 and the signal terminals 210 are cut from metal plates, and when assembled, the ground terminals 220 and the signal terminals 210 are arranged in a row along the first direction X. The punching surfaces of the conventional signal terminal 210 and ground terminal 220 during processing are parallel, that is, the punching surfaces are perpendicular to the second direction Y in the present application; however, in the present application, the punching surface of the ground terminal 220 is perpendicular to the punching surface of the signal terminal 210, that is, the punching surface of the signal terminal 210 is perpendicular to the second direction Y, and the punching surface of the ground terminal 220 is perpendicular to the first direction X, so the projection length of the ground terminal 220 in the first direction X is the thickness of the metal plate; as compared to the conventional ground terminal 220, the projection length of the ground terminal 220 of the present application in the first direction X is shorter so that two ground terminals 220 may be welded on the same second pad 22, and thus more ground terminals 220 may be provided for two pairs of adjacent signal terminals 210 with equal spacing. It shall be noted that, the punching surface is the side of the metal plate that faces the punching die during processing.

Figure 9:
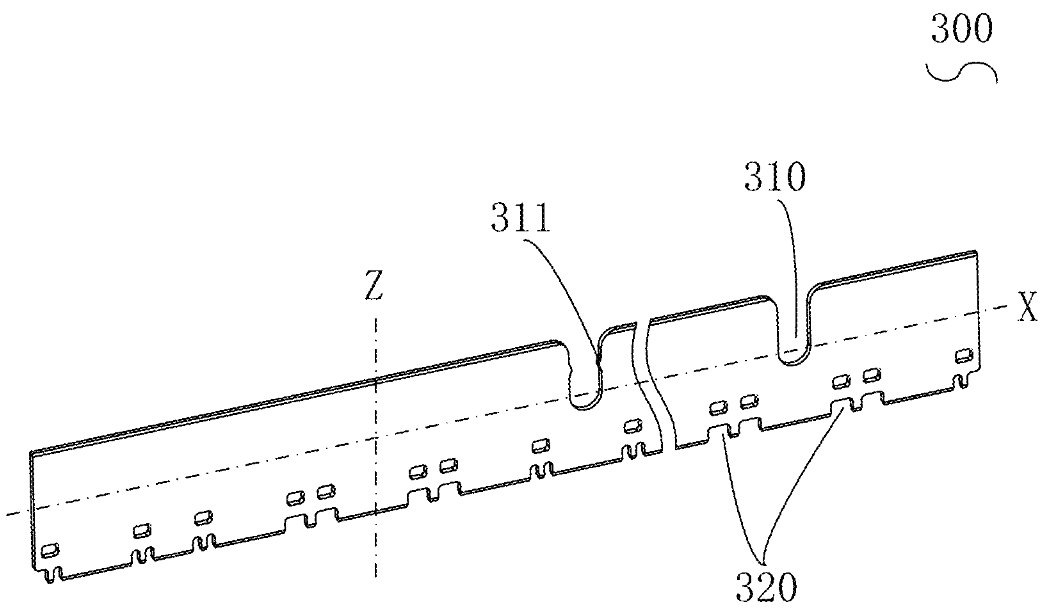
FIG. 9 is a broken view of a schematic perspective view of a conductive member according to an embodiment of the present application.

For the conductive member 300 described above, reference is made to FIG. 9 which shows the broken view of the schematic perspective view of the conductive member according to the embodiment of the present application; and in combination with the figure, the conductive member 300 is in a rectangular plate shape as a whole, and correspondingly covers the ground terminal 220 in the first direction X. The number of the conductive members 300 is two, and the two conductive members 300 are oppositely arranged on both sides of the slot 110 along the second direction Y, each conductive member 300 is correspondingly connected to each ground terminal 220 in a terminal module 200, and the conductive member 300 is located on one side of the terminal module 200 facing away from the slot 110. It shall be noted that, in the embodiment of the present application, in order to reduce the number of parts, the number of the conductive members 300 is set to be two, but the number of the conductive members 300 is not limited in the present application; in other embodiments of the present application, the number of the conductive members 300 on a single side in the second direction Y may be respectively set to be two, five and so on, thereby reducing the unidirectional length of the conductive members 300.

Preferably, the conductive member 300 is provided with a U-shaped through slot 310 on one side facing away from the circuit board 20 in the third direction Z, the number of the through slots 310 is six, and the six through slots 310 are arranged at intervals along the first direction X. When the conductive member 300 is installed on the insulating body 100, the through slots 310 are arranged in the first direction X to avoid the ground terminals 220, and the through slots 310 are asymmetrically distributed in the first direction X on the conductive member 300. Both sidewalls of the through slot 310 in the first direction X are provided with bumps 311, and the bumps 311 are used for clamping the insulating body 100. The through slot 310 is used for clamping the conductive member 300 onto the insulating body 100 when the conductive member 300 is installed on the insulating body 100, thereby realizing the fixed installation of the conductive member 300 on the insulating body 100. It shall be noted that, the specific shape of the through slot 310 is not limited in the present application, and in other embodiments of the present application, the through slot 310 may also be rectangular or semi-circular or the like. It shall also be noted that, in order not to affect the contact between the conductive member 300 and the ground terminal 220, the through slots 310 need to be arranged to avoid the ground terminal 220, so the multiple through slots 310 arranged in asymmetrical distribution may be used for foolproof; however, the number of the through slots 310 is not limited in the present application, and the number of the through slots 310 may be one, three and so on while ensuring the contact between the conductive member 300 and the ground terminal 220, the multiple through slots 310 are arranged at intervals along the first direction X, and the through slots 310 may be symmetrically distributed on the conductive member 300 in the first direction X.

Preferably, one side of the conductive member 300 near the circuit board 20 in the third direction Z is provided with accommodating grooves 320, the accommodating grooves 320 are provided in multiple and are arranged in one-to-one correspondence with the ground terminals 220. When the conductive member 300 is installed on the insulating body 100, the fixing part 221 extends into the accommodating groove 320, and at this point, the conductive member 300 also extends into the groove 225. The accommodating groove 320 is used to further enhance the installation connection between the ground terminal 220 and the conductive member 300, and facilitate the positioning and installation of the conductive member 300 on the insulating body 100.

Figure 10:
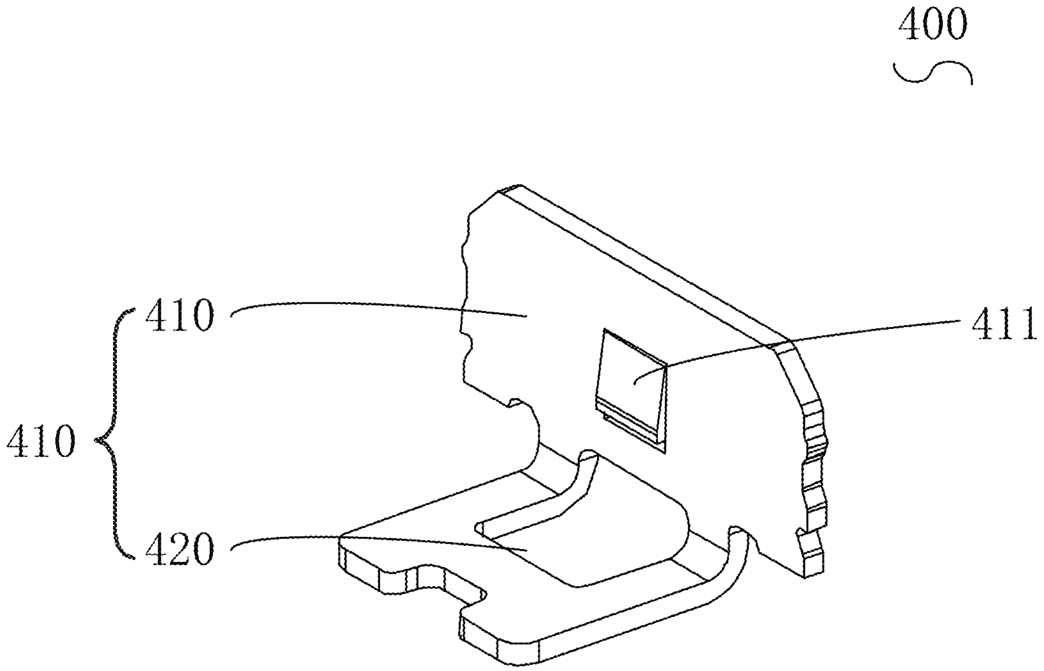
FIG. 10 is a schematic perspective view of a fixing member according to an embodiment of the present application.

Preferably, the connector 10 further comprises a fixing member 400, and reference is made to FIG. 10, which shows a schematic perspective view of the fixing member according to the embodiment of the present application, in combination with FIG. 2. The fixing member 400 comprises a first connecting part 410 and a second connecting part 420, the first connecting part 410 extends along the third direction Z and is arranged close to the terminal module 200, and the first connecting part 410 is provided with a buckle 411 which is used to be buckled and fixed onto the insulating body 100. The second connecting part 420 extends along the first direction X and is located on one side of the first connecting part 410 facing away from the terminal module 200, and the second connecting part 420 is used to be welded to the circuit board 20. The number of the fixing members 400 is two, and the two fixing members 400 are arranged at both ends of the connector 10 in a mirroring manner in the first direction X, the fixing members 400 are used for strengthening the connection between the insulating body 100 and the circuit board 20, and the design of the two fixing members 400 plays a role in enclosing and protecting the terminal module 200; as compared to the signal terminal 210 and the ground terminal 220, the fixing part 221 has a larger welding area with the circuit board 20, so it is possible to reduce the probability of de-soldering for the signal terminal 210 and the ground terminal 220 when the connector 10 is subjected to an external force. It shall be noted that, the way in which the first connecting part 410 is fixed to the insulating body 100 is not limited in the present application, and in other embodiments of the present application, the first connecting part 410 may also be fixed to the insulating body 100 by riveting or screwing.

Preferably, the insulating body 100 is provided with positioning posts (not shown) on one side close to the circuit board 20 along the third direction Z, the number of the positioning posts is two and the two positioning posts are arranged at intervals along the first direction X, and in the direction perpendicular to the third direction Z, the projection of one positioning post is within the projection of the positioning part 111, and the projection of the other positioning post is within the projection of the fixing member 400, thereby improving the space utilization rate of the connector 10. The circuit board 20 is provided with positioning holes 23 matched with the positioning posts, and the positioning posts are inserted into the positioning holes 23 to align the terminal module 200 with the first pads 21 and the second pads 22 on the circuit board 20. It shall be noted that, the number of the positioning posts as well as the distribution positions of the positioning posts are not limited in the present application, and in other embodiments of the present application, the number of the positioning posts may be one, three and so on, and when the number of the positioning post is one, the positioning post need to be designed with a foolproof surface, and a plurality of positioning posts may be arranged on the insulating body 100 at intervals along the first direction X or in a matrix arrangement.

Preferably, along the first direction X, the portion of the projection of the signal terminal 210 on the ground terminal 220 accounts for more than 80% of the projection, and such a design is beneficial for the ground terminal 220 to conduct the resonance generated by the signal terminal 210.

The embodiment of the present application is provided with the conductive member 300, and the ground terminal 220 is connected with the conductive member 300 in at least two places, so that the return paths of resonance are increased, thereby improving the shielding effect of resonance. Moreover, the punching surface of the ground terminal 220 in the present application is perpendicular to the first direction X, and the projection length of main body thereof in the first direction X is the thickness of the metal plate; as compared to the existing ground terminal 220, the ground terminal 220 in the embodiment of the present application has a smaller thickness in the first direction X, so that more ground terminals 220 may be directly arranged for each pair of signal terminals 210 at the same interval, thereby increasing the number of the ground terminals 220 and further increasing the return paths of resonance, and improving the transmission quality and reliability or the like of high-speed signals of the connector 10.

Based on the same inventive concept, the present application further provides a connector 10, the connector 10 is used for plugging and matching with an external electronic device 2, and includes the connector 10 described above; since the connector 10 described above is included, the connector 10 of the present application can also increase the return paths of resonance at the ground terminals 220, thereby improving the shielding effect of resonance.

Based on the same inventive concept, the present application further provides an electronic equipment which includes the connector module 1 described above; since the connector module 1 described above is included, the electronic equipment of the present application can also increase the return paths of resonance at the ground terminals 220, thereby improving the shielding effect of resonance, and further improving the transmission quality and reliability or the like of high-speed signals of the electronic equipment. As shall be appreciated that, in other embodiments of the present application, the electronic equipment may also only comprise the aforesaid connector 10 while still having the above effects.

It shall be noted that, the specification of the present application and the attached drawings thereof give preferred embodiments of the present application, but the present application may be realized in many different forms instead of being limited to the embodiments described in this specification; these embodiments are not used as additional restrictions on the contents of the present application, and these embodiments are provided for more thorough and comprehensive understanding of the disclosure of the present application. Moreover, the above technical features continue to be combined with each other to form various embodiments not listed above, and all these embodiments are regarded as within the scope recorded in the specification of the present application; furthermore, those of ordinary skill in the art can make improvements or changes according to the above description, and all these improvements and changes shall belong to the scope claimed in the appended claims of the present application.

What is claimed is:

1. A connector for connecting with an external electronic device, being characterized in that, comprising:

an insulating body, being opened with a slot for plugging and matching with the electronic device;

a terminal module, comprising several pairs of signal terminals and several ground terminals installed on the insulating body, the signal terminals and the ground terminals at least partially extending into the slot, the signal terminals and the ground terminals being arranged along a first direction, and at least two ground terminals being arranged between each adjacent pair of the signal terminals; and a conductive member, being installed on the insulating body;

wherein the ground terminal comprises:

a fixing part, being fixed with the insulating body;

a connecting arm, being formed by extending from the fixing part, the connecting arm at least partially extending into the slot and being configured to be electrically connected with golden fingers on the electronic device;

a first contacting part, being arranged on the connecting arm, the first contacting part being connected with the conductive member; and a second contacting part, being arranged on the fixing part, the second contacting part being connected with the conductive member;

wherein, a groove is enclosed by the second contacting part and the connecting arm, and the conductive member is at least partially accommodated in the groove.

2. The connector according to claim 1, being characterized in that, in the first direction, the two ground terminals between each adjacent pair of the signal terminals are connected with the conductive member.

3. The connector according to claim 1, being characterized in that, the conductive member is arranged on one side of the terminal module facing away from the slot.

4. The connector according to claim 3, being characterized in that, the connector comprises two terminal modules and two conductive members;

the two terminal modules are oppositely arranged on both sides of the slot along a second direction, and the two conductive members are oppositely arranged on both sides of the slot along the second direction, and the conductive members are used for connecting multiple ground terminals on one side of the slot.

5. A connector module, being characterized in that, comprising:

the connector according to claim 1; and a circuit board, being provided with first pads and second pads, each of the signal terminals is correspondingly welded to one of the first pads, and the ground terminal is correspondingly welded to one of the second pads, and the size of the first pads is the same as that of the second pads.

6. The connector module according to claim 5, being characterized in that, one or two of the ground terminals are welded to the same second pad.

7. An electronic equipment, being characterized in that, comprising:

the connector module according to claim 5.

8. An electronic equipment, being characterized in that, comprising:

the connector according to claim 1.

* * * * *